United States Patent
Apostol, Jr. et al.

(10) Patent No.: US 7,436,954 B2
(45) Date of Patent: Oct. 14, 2008

(54) SECURITY SYSTEM WITH AN INTELLIGENT DMA CONTROLLER

(75) Inventors: George Apostol, Jr., Santa Clara, CA (US); Peter N. Dinh, San Jose, CA (US)

(73) Assignee: Cavium Networks, Inc., Mountain View, CA (US)

( * ) Notice: Subject to any disclaimer, the term of this patent is extended or adjusted under 35 U.S.C. 154(b) by 811 days.

(21) Appl. No.: 10/469,467

(22) PCT Filed: Feb. 28, 2002
(Under 37 CFR 1.47)

(86) PCT No.: PCT/US02/06384

§ 371 (c)(1),
(2), (4) Date: Apr. 5, 2004

(87) PCT Pub. No.: WO02/069115

PCT Pub. Date: Sep. 6, 2002

(65) Prior Publication Data

US 2005/0259823 A1    Nov. 24, 2005

Related U.S. Application Data

(60) Provisional application No. 60/272,439, filed on Feb. 28, 2001.

(51) Int. Cl.
*H04K 1/04* (2006.01)
*H04K 1/06* (2006.01)

(52) U.S. Cl. .................. 380/37; 711/114; 713/164; 235/382; 710/41; 709/228; 709/243; 370/355; 707/1

(58) Field of Classification Search .................... 726/10
See application file for complete search history.

(56) References Cited

U.S. PATENT DOCUMENTS

| | | | | |
|---|---|---|---|---|
| 4,352,952 A | * | 10/1982 | Boone et al. | 713/192 |
| 4,697,262 A | | 9/1987 | Segal et al. | |
| 5,185,864 A | | 2/1993 | Bonevento et al. | |
| 5,197,130 A | | 3/1993 | Chen et al. | |
| 5,222,223 A | | 6/1993 | Webb, Jr. et al. | |
| 5,224,166 A | | 6/1993 | Hartman, Jr. | |
| 5,353,417 A | * | 10/1994 | Fuoco et al. | 710/309 |
| 5,388,261 A | | 2/1995 | Anderson et al. | |

(Continued)

FOREIGN PATENT DOCUMENTS

WO    WO-01/18997 A1    3/2001

*Primary Examiner*—Kambiz Zand
*Assistant Examiner*—Dant B Shaifer
(74) *Attorney, Agent, or Firm*—Hamilton, Brook, Smith & Reynolds, PC

(57) ABSTRACT

A security subsystem is provided with at least a first security engine, a first set of registers and a control portion to perform a first security operation for each of a first number of data blocks of each of a first number of data segments of a first data object. In one embodiment, the security subsystem is provided with two security engines and two sets of registers to respectively perform the first security operation and a second security operation for the first data object and a similarly constituted second data object. In one embodiment, the first and second security operations are DES and hashing operations. In one embodiment, the multi-method security subsystem is embodied in a multi-service system-on-chip.

72 Claims, 10 Drawing Sheets

U.S. PATENT DOCUMENTS

| | | | |
|---|---|---|---|
| 5,606,668 A * | 2/1997 | Shwed | 726/13 |
| 5,657,472 A | 8/1997 | Van Loo et al. | |
| 5,668,813 A | 9/1997 | Malek et al. | |
| 5,799,207 A | 8/1998 | Wang et al. | |
| 5,812,799 A | 9/1998 | Zuravleff et al. | |
| 5,848,367 A * | 12/1998 | Lotocky et al. | 701/36 |
| 5,905,876 A | 5/1999 | Pawlowski et al. | |
| 6,021,201 A * | 2/2000 | Bakhle et al. | 380/37 |
| 6,028,939 A * | 2/2000 | Yin | 713/189 |
| 6,034,542 A | 3/2000 | Ridgeway | |
| 6,058,474 A | 5/2000 | Baltz et al. | |
| 6,081,852 A * | 6/2000 | Baker | 710/24 |
| 6,118,462 A | 9/2000 | Margulis | |
| 6,122,690 A | 9/2000 | Nannetti et al. | |
| 6,185,520 B1 | 2/2001 | Brown et al. | |
| 6,317,803 B1 | 11/2001 | Rasmussen et al. | |
| 6,321,285 B1 | 11/2001 | Sheafor et al. | |
| 6,321,318 B1 | 11/2001 | Baltz et al. | |
| 6,347,344 B1 | 2/2002 | Baker et al. | |
| RE37,980 E | 2/2003 | Elkhoury et al. | |
| 6,557,078 B1 | 4/2003 | Mulla et al. | |
| 6,560,160 B1 | 5/2003 | Grace | |
| 6,675,243 B1 * | 1/2004 | Bastiani et al. | 710/105 |
| 6,681,270 B1 | 1/2004 | Agarwala et al. | |
| 6,778,667 B1 * | 8/2004 | Bakhle et al. | 380/37 |
| 6,784,890 B1 | 8/2004 | Bergeson et al. | |
| 7,020,763 B2 | 3/2006 | Saulsbury et al. | |
| 7,035,966 B2 | 4/2006 | Zitlaw | |
| 2001/0026439 A1 | 10/2001 | Geusic et al. | |
| 2001/0049726 A1 | 12/2001 | Comeau et al. | |
| 2003/0189573 A1 | 10/2003 | Dahlen et al. | |
| 2004/0128144 A1 | 7/2004 | Johnson et al. | |
| 2004/0172490 A1 | 9/2004 | Stadler et al. | |
| 2004/0250056 A1 | 12/2004 | Chang | |

* cited by examiner

Base Part of a Descriptor (for DES Operation) 118a

| |
|---|
| Next Descriptor/Part Address, Base/Continuation, Valid ~ 402 |
| Buffer Size ~ 404 |
| Starting Address Source Buffer ~ 406 |
| Starting Address Destination Buffer ~ 408 |
| DES Mode ~ 410 |
| Descriptor ID ~ 412 |
| CBC and CFB mode Initial Vector High [63:32] ~ 414 |
| CBC and CFB mode Initial Vector Low [31:0] ~ 416 |
| Key1 High [63:32] ~ 418 |
| Key1 Low [31:0] ~ 420 |
| Key2 High [63:32] ~ 422 |
| Key2 Low [31:0] ~ 424 |
| Key3 High [63:32] ~ 426 |
| Key3 Low [31:0] ~ 428 |

Figure 4a

Continuation Part of a Descriptor (for DES Operation) 118b

| |
|---|
| Next Descriptor/Part Address, Base/Continuation, Valid ~ 432 |
| Buffer Size ~ 434 |
| Starting Address Source Buffer ~ 436 |
| Starting Address Destination Buffer ~ 438 |

Figure 4b

Base Part of a Descriptor (for Hashing Operation) 118a

| |
|---|
| Next Descriptor/Part Address, Base/Continuation, Valid ~ 442 |

| |
|---|
| Buffer Size ~ 444 |
| Starting Address Source Buffer ~ 446 |
| Starting Address Destination Buffer ~ 448 |
| Hashing Mode ~ 450 |
| Descriptor ID ~ 452 |
| Reserved |
| Reserved |
| Chaining Variable A ~ 454 |
| Chaining Variable B ~ 456 |
| Chaining Variable C ~ 458 |
| Chaining Variable D ~ 460 |
| Chaining Variable E for SHA-1 or Must write filler data for MD5 ~ 462 |
| Must write filler data for MD5 ~ 464 |

Figure 4c

Continuation Part of a Descriptor (for Hashing Operation) 118b

| |
|---|
| Next Descriptor/Part Address, Base/Continuation, Valid ~ 472 |
| Buffer Size ~ 474 |
| Starting Address Source Buffer ~ 476 |
| Starting Address Destination Buffer ~ 478 |

Figure 4d

Control Registers 600

| |
|---|
| Global Interrupt Disable/Enable ~ 602 |
| Interrupt on Data Segment Complete Disable/Enable ~ 604 |
| Interrupt on Data Object Complete Disable/Enable ~ 606 |

| |
|---|
| Interrupt on Error Unforced/Forced ~ 608 |
| Stop on Segment/Data Object Complete ~ 610 |
| Halt No/Yes ~ 612 |
| Normal Operation or Reset ~ 614 |
| No Op or Start/Continue Operation ~ 616 |

Figure 6a

Status Registers 620

| |
|---|
| Bad Write Back Address ~ 622 |
| Remaining Byte Count to Write Back ~ 623 |
| Interrupt Pending on Data Segment Complete ~ 624 |
| Interrupt Pending on Data Object Complete ~ 626 |
| Interrupt Pending on Error ~ 628 |
| Segment Complete ~ 630 |
| Data Object Complete ~ 632 |
| Subsystem On ~ 634 |
| Output Valid ~ 636 |
| Subsystem Busy ~ 638 |

SECURITY SYSTEM WITH AN INTELLIGENT DMA CONTROLLER

RELATED APPLICATION

This application claims priority to U.S. Provisional Application No. 60/272,439, entitled "MULTI-SERVICE PROCESSOR INCLUDING A MULTI-SERVICE BUS", filed Feb. 28, 2001, the specification of which is hereby fully incorporated by reference.

BACKGROUND OF THE INVENTION

1. Field of the Invention

The present invention relates to the field of security. More specifically, the present invention relates to the provision of a security subsystem having an intelligent direct memory access (DMA) controller in a multi-service system-on-chip to improve operational efficiency.

2. Background Information

Advances in integrated circuit technology have led to the birth and proliferation of a wide variety of integrated circuits, including but not limited to application specific integrated circuits, micro-controllers, digital signal processors, general purpose microprocessors, and network processors. Recent advances have also led to the birth of what's known as "system on a chip" or SOC.

In various SOC applications, such as telecommunications, networking and content handling, it is often necessary to perform security operations of one or more types of security methods. The terms "security operations" and "security methods" as used in the present application include all known security operations/methods, as well as to be discovered security operations/methods that are compatible with the present invention. Examples of known security operations/methods include but are not limited to Data Encryption Standard (DES) methods and operations of all types, Electronic Codebook (ECB), Cipher Block Chaining (CBC), Cipher Feedback (CFB), and so forth, and hashing operations of all types, Message Digest (MD5), Secure HASH Algorithm (SHA-1) and so forth.

Further, the security methods or operations often have to be performed for data of various types, including audio, video and other data, and of various subsystems, such as the subsystem responsible for interfacing the SOC to a network, the subsystem responsible for interfacing the SOC to a telecommunication line and so forth.

Thus, a need exists to provide or support security operations of multiple security methods or operations in an efficient manner.

BRIEF DESCRIPTION OF DRAWINGS

The present invention will be described by way of exemplary embodiments, but not limitations, illustrated in the accompanying drawings in which like references denote similar elements, and in which:

FIGS. 4a-4d illustrate the base and continuation portion of a data descriptor in further details, in accordance with one embodiment;

FIGS. 6a-6b illustrate the control and status registers of the security subsystem of FIG. 5 in further details, in accordance with one embodiment;

DETAILED DESCRIPTION OF THE INVENTION

The present invention includes a security subsystem equipped with an intelligent DMA controller having particular application to system-on-chips with subsystems requiring security services. The security services may include encryption/decryption services/operations, such as DES based encryptions/decryptions, and/or hashing operations, such as MD5 and SHA-1. The present invention advantageously improves the operational efficiency of the system-on-chip, in particular, offloading the controller processor of a system-on-chip.

In the following description, various features and arrangements will be described, to provide a thorough understanding of the present invention. However, the present invention may be practiced without some of the specific details or with alternate features/arrangement. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous.

Overview

Figure 1:
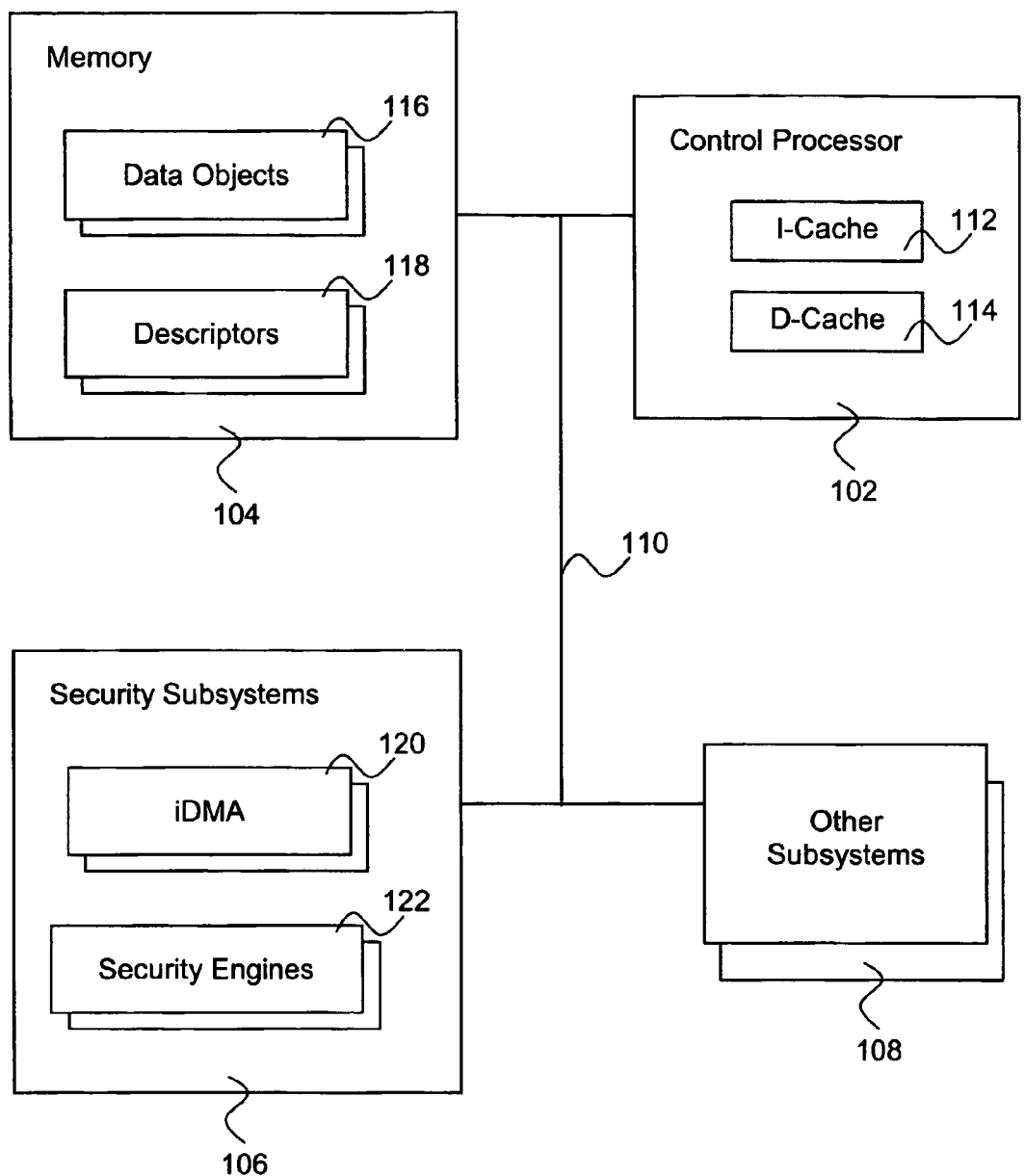
FIG. 1 illustrates an overview of a system-on-chip including a security subsystem incorporated with the teachings of the present invention, in accordance with one embodiment.

Referring now to FIG. 1, wherein a block diagram illustrating an overview of a SOC 100 including control processor 102, memory 104, security subsystem 106 incorporated with the teachings of the present invention, and other subsystems 108, in accordance with one embodiment, is shown. As illustrated, for the embodiment, control processor 102, memory 104, security subsystem 106 and other subsystems 108 are coupled to each other via on-chip bus 110, and communicate with each other in accordance with a predetermined bus protocol. In one embodiment, the on-chip bus and the bus protocol is the on-chip bus described in co-pending U.S. application Ser. No. 10/086,938 contemporaneously filed, entitled "A Multi-Service System On-Chip Including On-Chip Memory with Multiple Access Paths", which specification is hereby fully incorporated by reference. In other embodiments, other bus architectures and other bus communication protocols may be employed instead.

Security subsystem 106 equipped with the teachings of present invention, is employed to provide security services/operations to meet the security service/operation needs of subsystems 108. As will be described in more details below, in addition to security engines 122 in support of various security methods, DES operations, hashing operations, and so forth, security subsystem 106 includes intelligent DMA 120 of the present invention. Resultantly, unless so desired, upon requested, security subsystem 106 may service a security need of one of subsystems 108 substantially without further interactions with control processor 102 and the requesting subsystem 108, thereby improving the overall operational efficiency of SOC 100.

The terms "security service" and "security operation" are used interchangeably in the present application, depending on which term is more instrumental in assisting in understanding the present invention. Their core meanings or the essence of their meanings are synonymous.

Except for the teachings of the present invention incorporated in subsystems 108, to allow subsystems 108 to have their security service needs met by security subsystem 106 in the aforementioned advantageous manner, subsystems 108 may otherwise be any one of a broad range of subsystems known in the art or to be developed. Examples of such subsystems include but are not limited to voice processors, peripheral device controllers, framer processors, network media access controllers, and the like. The exact mix is application dependent and non-essential to the practice of the present invention.

Except for its use for its conventional function of storing data, in particular data objects 116 to have security operations performed and data descriptors 118 of the present invention describing data objects 116 and the security operations to be performed, memory 104 may otherwise be any one of a broad range of volatile or non-volatile storage units known in the art or to be developed. In one embodiment, the memory 104 is a storage unit with multiple access paths, which is the subject matter of the aforementioned co-pending and incorporated by reference U.S. patent application Ser. No. 10/086,938.

Control processor 102 controls the overall operation of SOC 100. In particular, for the embodiment, the control includes instructing security system 106 to perform a security operation on a data object 116 on behalf of one of subsystems 108, which instruction may be responsive to the request of the subsystem. The exact nature of the remaining control performed by control processor 102 is application dependent, and is not essential to the practice of the present invention. As alluded to earlier, control processor 102 is one of primary beneficiaries of the present invention. Further, for the illustrated embodiment, control processor 102 includes instruction cache 112 and data cache 114, to facilitate performance of its control operations.

Method

Figure 2:
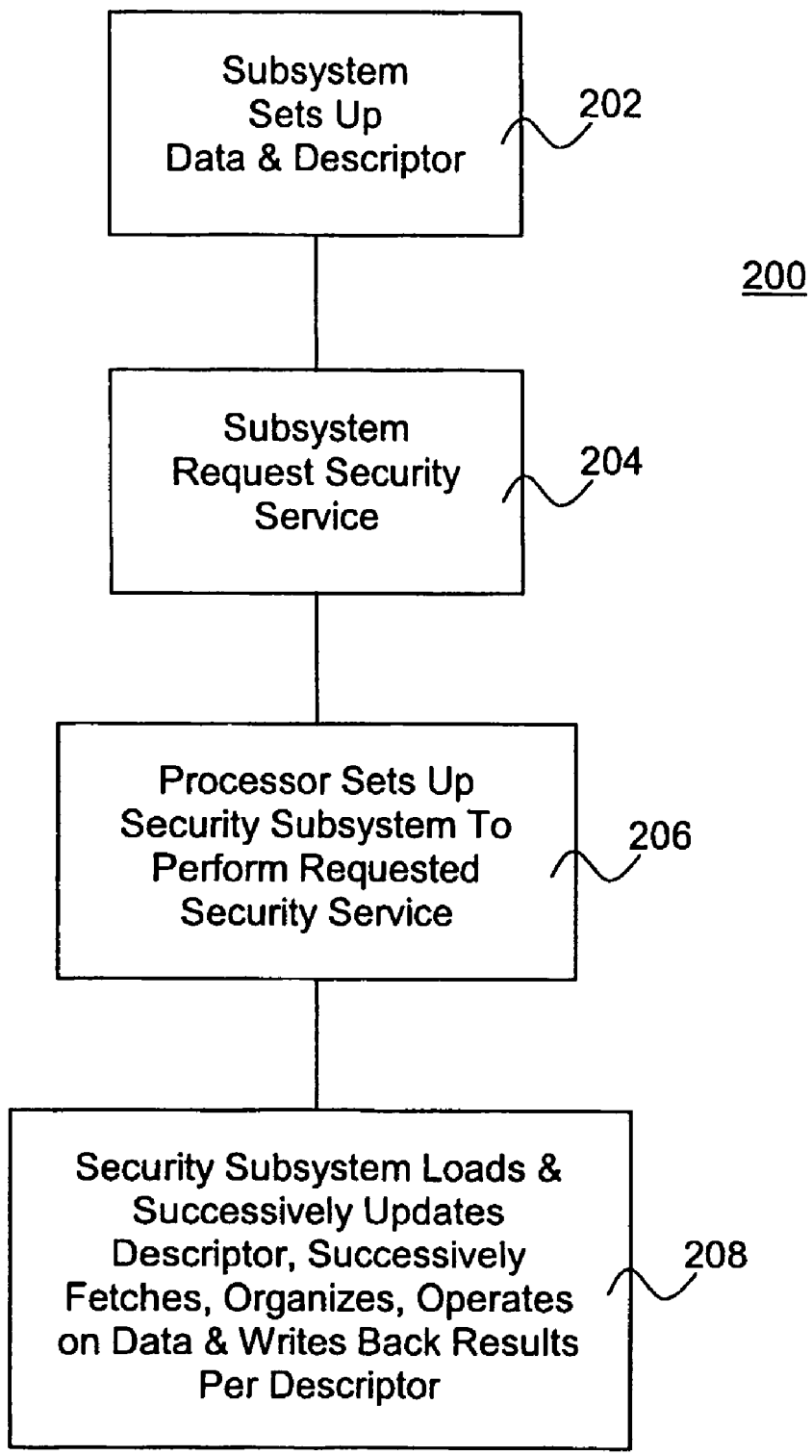
FIG. 2 illustrates the method of the present invention, in accordance with one embodiment.

Referring now to FIG. 2, wherein a flow chart illustrating a method of the present invention, in accordance with one embodiment, is shown. As illustrated, in accordance with the present invention, a subsystem 108 having a security service need for a data object, first sets up in memory 104 the data object, and a descriptor describing the data object, including the security operation to be performed and the operational parameters of the security operation, block 202.

Figure 3:
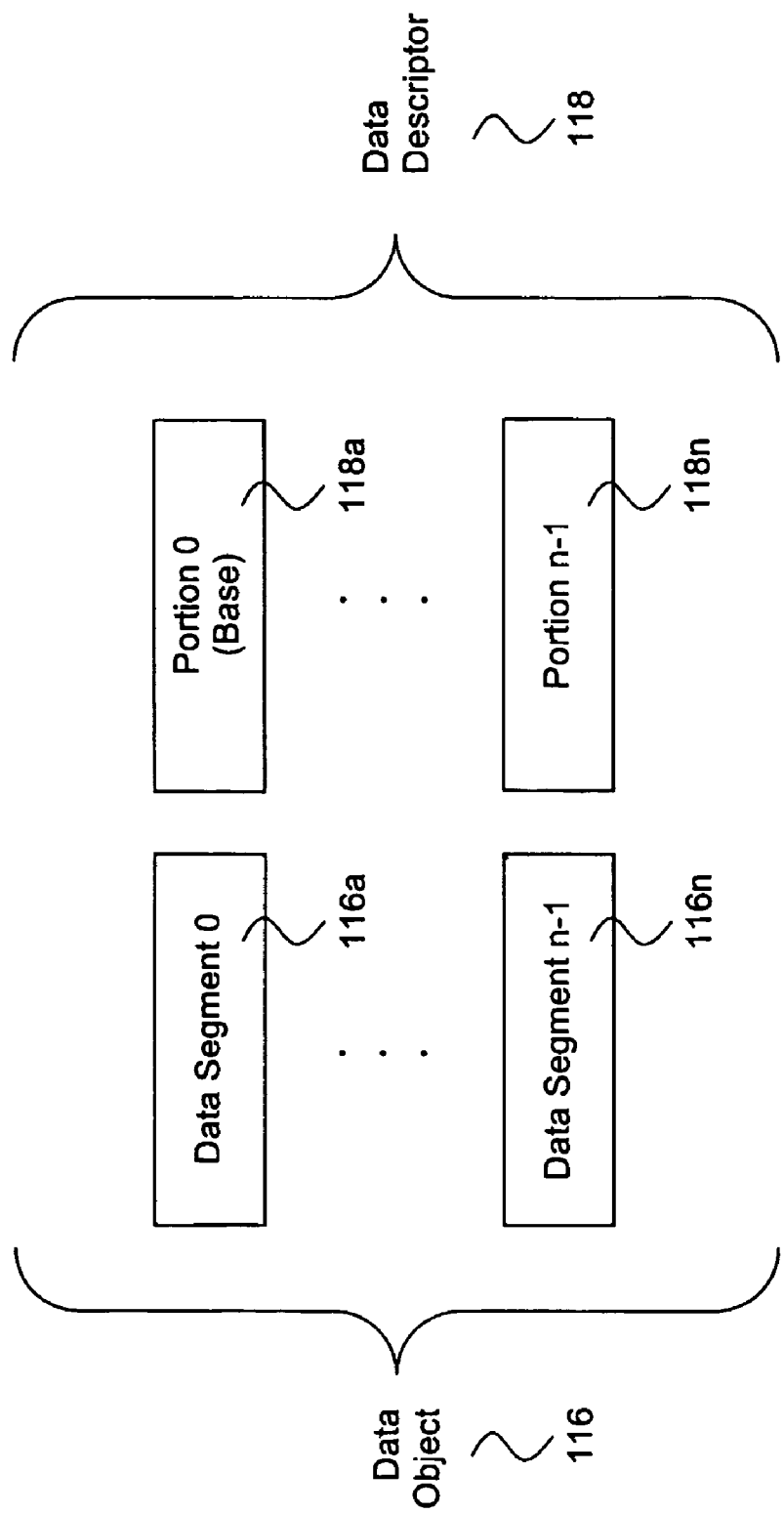
FIG. 3 illustrates the data descriptor of the present invention in further details, in accordance with one embodiment.

Referring now briefly to FIG. 3, under the present invention, a data object 116 to have a security operation performed may comprise a number of data segments 116a-116n, with each data segments having a number of data bits. The number of data bits in each data segment may be greater than, equal to, or less than the data bit size of an atomic block of data on which the request security operation operates. For example, a DES operation operates on 64-bit data blocks, accordingly, a data segment of a data object to have a DES operation performed may be greater than, equal to, or less than 64 bits. Similarly, a MD5/SHA-1 operation operates on 512-bit data blocks, a data segment of a data object to have a MD5/SHA-1 operation performed may be greater than, equal to, or less than 512 bits. Further, the various data segments may be stored in contiguous or discontiguous memory locations, and need not be aligned to any word boundaries.

A descriptor 118 describing a data object 116, the security operation to be performed, and the operation parameters, may include one or more parts, i.e. a base part 118a and zero or more continuation parts 118n, with the base part 118a describing the first data segment 116a, the security operation to be performed for all data segments 116a-116n and the operation parameters, and the continuation parts 118n correspondingly describing the additional data segments 116n, to be described more fully below.

Returning now to FIG. 2, upon setting up the data object 116 to have a security operation performed, and its descriptor 118, for the embodiment, the subsystem 108 requests control processor 102 to cause the desired security operation to be performed, block 204. Since, for the embodiment, the security operation to be performed, including the operation parameters, are described by the data descriptor 118 of the data object 116, accordingly only the location of the descriptor 118 needs to be made available to control processor 102. The information may be made available in any one of a number of manners known in the art. For example, the starting location of the descriptor may be place in a predetermined location associated with a particular interrupt, and the subsystem 108 interrupts control processor 102 accordingly, upon setting up the data object 116, its descriptor 118, and placement of the starting location of the descriptor 118 in the predetermined location. As a further example, the starting location of the descriptor 108 may be included as part of the security service request, and the security service request may be communicated to control processor 102 via a communication packet.

Still referring to FIG. 2, in response to the request, control processor 102 instructs security subsystem 106 to perform the requested security operation for the data object 116, including with the instruction, the starting location of the descriptor 118 of the data object 116, block 206. In one embodiment, the instruction is provided to security subsystem 106 in the form of a communication packet over bus 110.

In response, as will be described in more detail below, security subsystem 106 first loads the base part 118a of the descriptor 118 of the data object 116, and thereafter successively updates the descriptor 118 with its continuation parts 118n, and in parallel, based on the descriptive information provided therein over time, successively fetches the data bits of the data segment 116a, organizes the data bits into the atomic data blocks of the requested security operation, provides the organized data blocks to the appropriate security engine for the requested security operation, causes the security engine to perform the security operation on the provided data blocks, and writes back the results of the security operation, block 208.

Data Descriptor

FIGS. 4a-4d illustrate descriptor 118 of a data object 116, in accordance with one embodiment. More specifically, FIG. 4a illustrates the base part 118a of a descriptor 118 for a DES operation for a data object 116, in accordance with one embodiment; FIG. 4b illustrates a continuation part 118b of a descriptor 118 for a DES operation for a data object 116, in accordance with one embodiment; FIG. 4c illustrates the base part 118a of a descriptor 118 for a hashing operation for a data object 116, in accordance with one embodiment; and FIG. 4d illustrates a continuation part 118b of a descriptor 118 for a hashing operation for a data object 116, in accordance with one embodiment.

As illustrated in FIG. 4a, for the embodiment, the base part 118a of a descriptor 118 for a DES operation includes a next descriptor/part address 402 identifying the starting word location in memory 104 where the next part 118n of the descriptor 118 or the base part 118a of a next descriptor 118 is stored. The residual unused least significant bits are employed to facilitate identification of the part as being a base part 118a of a descriptor 118, and the next descriptor/part address information is valid, and may be acted on by the security subsystem 106.

Base part 118a for a DES operation also includes a buffer size 404 and a starting address 406 (in memory 104) of the source buffer holding the base data segment 116a being described. Base part 118a also includes the starting address 408 (in memory 104) for the destination buffer for writing back the results of the security operation for the corresponding data bits of the base data segment 116a.

Additionally, base part 118a for a DES operation also includes mode 410 specifying the type of DES operation, i.e. ECB, CBC or CFB, to be performed, and descriptor identifier 412 of the descriptor. Further, base part 118a of a DES operation also describes up to three keys 418-420, 422-424 and 426-428 for the DES operation, and for CBC or CFB mode of operation, base part 118a also describes the initial vector 414-416 of the DES operation.

As illustrated in FIG. 4b, for the embodiment, the continuation part 118n of a descriptor 118 for a DES operation also includes a next descriptor/part address 432 identifying the starting word location of memory 104 where the next part 118n of the descriptor 118 or the base part 118a of a next descriptor 118 is stored. Similarly, the residual least significant bits are employed to facilitate identification of the part as being a continuation of a descriptor 118, and the next descriptor/part address information is valid, and may be acted on by the security subsystem 106.

Similar to the base part 118a of a descriptor 118 for a DES operation, a continuation part 118n of a descriptor 118 of a DES operation also includes a buffer size 434 and a starting address 436 (in memory 104) of the source buffer holding the continuation data segment 116n being described. Continuation part 118n also includes the starting address 438 (in memory 104) for the destination buffer for writing back the results of the security operation for the corresponding data bits of the continuation data segment 116n.

As illustrated in FIG. 4c, for the embodiment, the base part 118a of a descriptor 118 for a hashing operation includes a next descriptor/part address 442 identifying the starting word location in memory 104 where the next part 118n of the descriptor 118 or the base part 118a of a next descriptor 118 is stored. The residual unused least significant bits are employed to facilitate identification of the part as being a base part 118a of a descriptor 118, and the next descriptor/part address information is valid, and may be acted on by the security subsystem 106.

Base part 118a for a hashing operation also includes a buffer size 444 and a starting address 446 (in memory 104) of the source buffer holding the base data segment 116a being described. Base part 118a also includes the starting address 448 (in memory 104) for the destination buffer for writing back the results of the security operation for the corresponding data bits of the base data segment 116a.

Additionally, base part 118a for a hashing operation also includes mode 450 specifying the type of hashing operation, e.g. MD5 or SHA-1, to be performed, and descriptor identifier 452 of the descriptor. Further, base part 118a of a hashing operation also describes at least four chaining variable 454-460, for the hashing operation, and for the SHA-1 mode of operation, a fifth chaining variable 462. For a MD5 hashing operation, base part 118a also describes the "must write filer data" 462-464 of the hashing operation.

As illustrated in FIG. 4d, for the embodiment, the constitution of a continuation part 118n of a descriptor 118 for a hashing operation is the same as a continuation part 118n of a descriptor 118 for a hashing operation. Continuation part 118n of a descriptor 118 for a hashing operation includes a next descriptor/part address 472 identifying the starting word location of memory 104 where the next part 118n of the descriptor 118 or the base part 118a of a next descriptor 118 is stored. The residual unused least significant bits are employed to facilitate identification of the part as being a continuation of a descriptor 118, and the next descriptor/part address information is valid, and may be acted on by the security subsystem 106.

Continuation part 118n of a descriptor 118 of a hashing operation also includes a buffer size 474 and a starting address 476 (in memory 104) of the source buffer holding the continuation data segment 116n being described. Continuation part 118n also includes the starting address 478 (in memory 104) for the destination buffer for writing back the results of the security operation for the corresponding data bits of the continuation data segment 116n.

Security Subsystem

Figure 5:
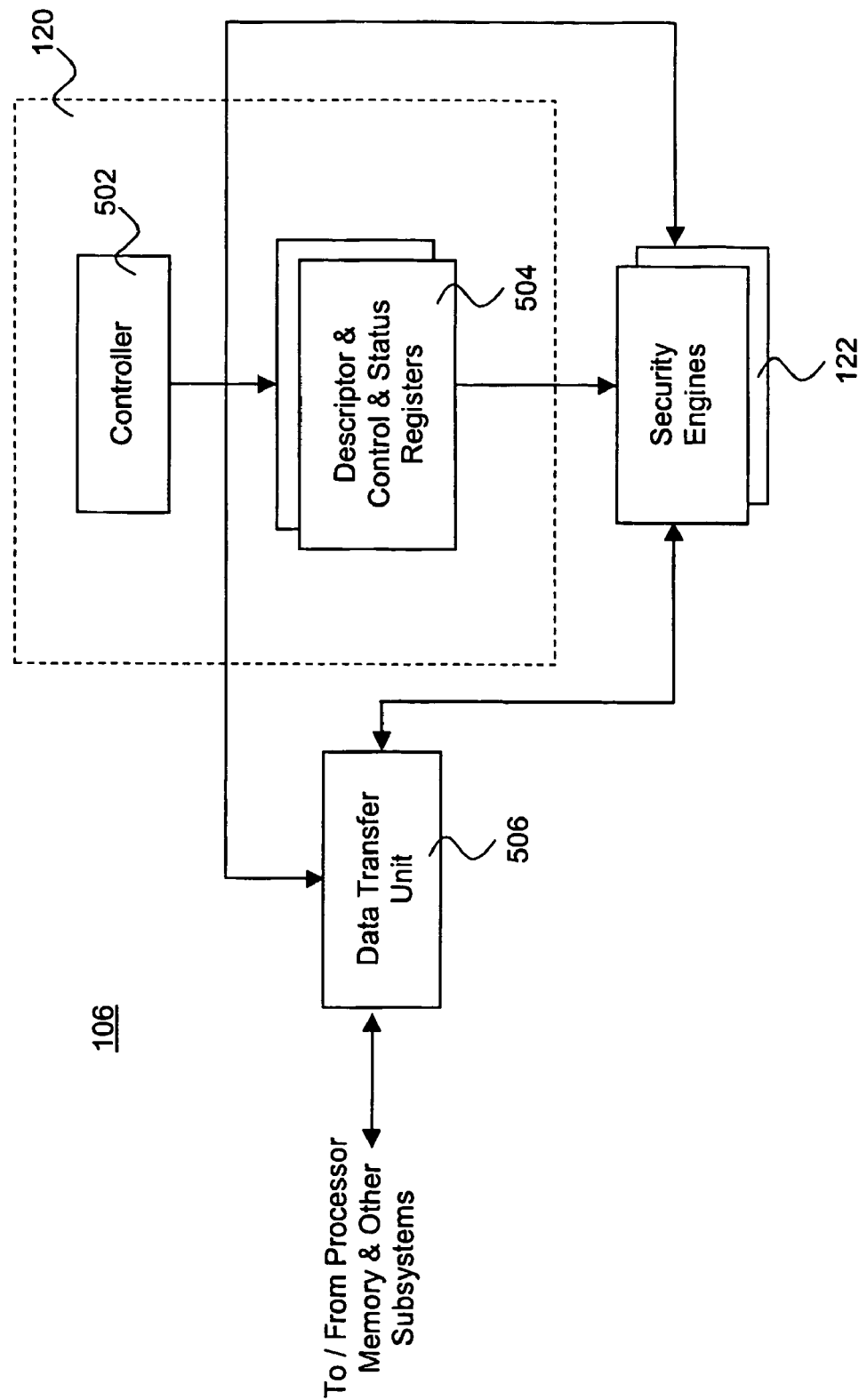
FIG. 5 illustrates the security subsystem of the present invention in further details, in accordance with one embodiment.

FIG. 5 illustrates security subsystem 106 of the present invention in further details, in accordance with one embodiment. As illustrated, for the embodiment, security subsystem 106 includes controller 502, registers 504, data transfer unit 506 and security engines 122, coupled to each other as shown.

Data transfer unit 506 is employed to facilitate receipt of instructions from control processor 102 to perform security operations for various data objects 116, access and receipt of the various parts of the descriptors 118 of the various data objects 116, access and receipt of the various data segments of the various data objects 116, and write back of the results of the various security operations. One embodiment of data transfer unit 506 is described in the aforementioned Ser. No. 10/086,938 copending and incorporated by reference U.S. patent application. In alternate embodiments, other data interfaces may be employed instead.

Registers 504 include a number of collections, with each collection employed to store a fetched descriptor, e.g. one collection to store the descriptor of a DES operation to be or being performed, and another collection to store the descriptor of a hashing operation to be or being performed. In one embodiment, two collections of registers, with one collection dedicated to support a DES operation, and another collection dedicated to support a hashing operation, are provided.

For the embodiment, registers 504 also include a number of collections of control registers, one collection each for each security operation concurrently supported, to facilitate control processor 102 in specifying for security subsystem 106 a number of general operation parameters for performing the corresponding security operation. In one embodiment, two such collections, one for a DES operation and another for a hashing operation, are supported. The content and meaning of these control parameters for one embodiment is described in further detail below referencing FIG. 6a.

For the embodiment, registers 504 also include a number of collections of status registers, one collection each for each security operation concurrently supported, to facilitate appraising control processor 102 of the current status of security subsystem 106 for the corresponding security operation. In one embodiment, two such collections, one for DES operation and another for hashing operation are supported. The content and meaning of these status for one embodiment is described in further detail below referencing FIG. 6b.

Registers 504 may be implemented via any one of a number of techniques known in the art. In one embodiment, a multi-port addressable memory unit is employed to implement all registers 504 in a single storage unit.

Security engines 106 are employed to perform security operations of corresponding types. In one embodiment, one security engine coupled with a data traffic router for performing various types of DES operations, ECB, CBC and CFB (see FIG. 7 where data traffic router is shown as element 702), one security engine for performing MD5 hashing operations, and one security engine for performing SHA-1 hashing operations are provided. Any one of a number of implementations known in the art may be employed to implement the various security engine cores, i.e. the security engine core for performing DEA ECB, CBC and CFB operations, the security engine core for performing MD5 hashing operations, and the security engine core for performing SHA-1 hashing operations. Their exact implementations are not essential aspects of the present invention. One embodiment of the data traffic router enabling a single DES security engine core to be provided for multiple modes of DES security operations will be further described below, referencing FIG. 8.

Controller 502 controls the operation of data transfer unit 506, registers 504 and security engines 106. The relevant operational flow for one embodiment will be described in further details below, referencing FIG. 9.

Control and Status Registers of the Security Subsystem

As alluded to earlier, FIG. 6a-6b illustrate one each of a collection of control registers 600 and a collection of status registers 620 for a security operation concurrently supported, e.g. a DES operation, or a hashing operation.

Control registers 600 include register 602 for control processor 102 to globally disable or enable interrupt mode of operation for the security operation. Control registers 600 also include registers 604-608 for control processor 102 to instruct security subsystem 106 to interrupt control processor 102 upon completion of a data segment, upon completion of a data object or upon encountering an operation error while performing the security operation. Further, control registers 600 include registers 610-616 for control processor 102 to instruct security subsystem 106 to stop the security operation on completion of a data segment (including completion of a data object), halt operation altogether, to reset, or to start/continue for the security operation.

Status registers 620 include registers 622-623 for conveying to control processor 102 a bad write address was encountered by security subsystem 106, and the remaining byte counts of the results of the security operation. Status registers 620 also include registers 624-628 for conveying to control processor 102 an interrupt is pending, where the interrupt is issued by security system 106 upon completion of a data segment, completion of a data object or encountering an error, for the security operation. Status registers 620 also include registers 630-632 for conveying to control processor 102 that processing for a data segment or a data object has been completed for the security operation. Further, status registers 620 include registers 634-638 for conveying to control processor 102 that the subsystem is "on", its outputs are valid, or it is busy.

Data Traffic Router

Figure 7:
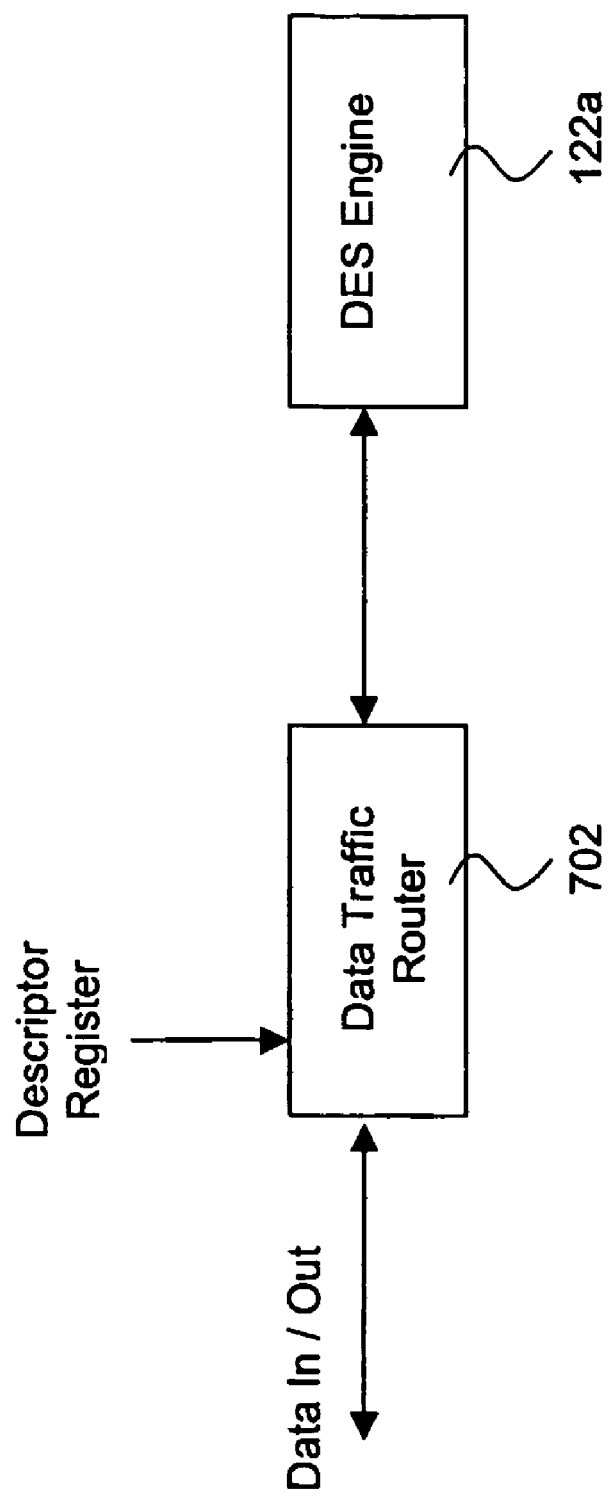
FIG. 7 illustrates the further provision of a data traffic router for a DES security engine to support multiple variants of DES operations, in accordance with one embodiment.
Figure 8:
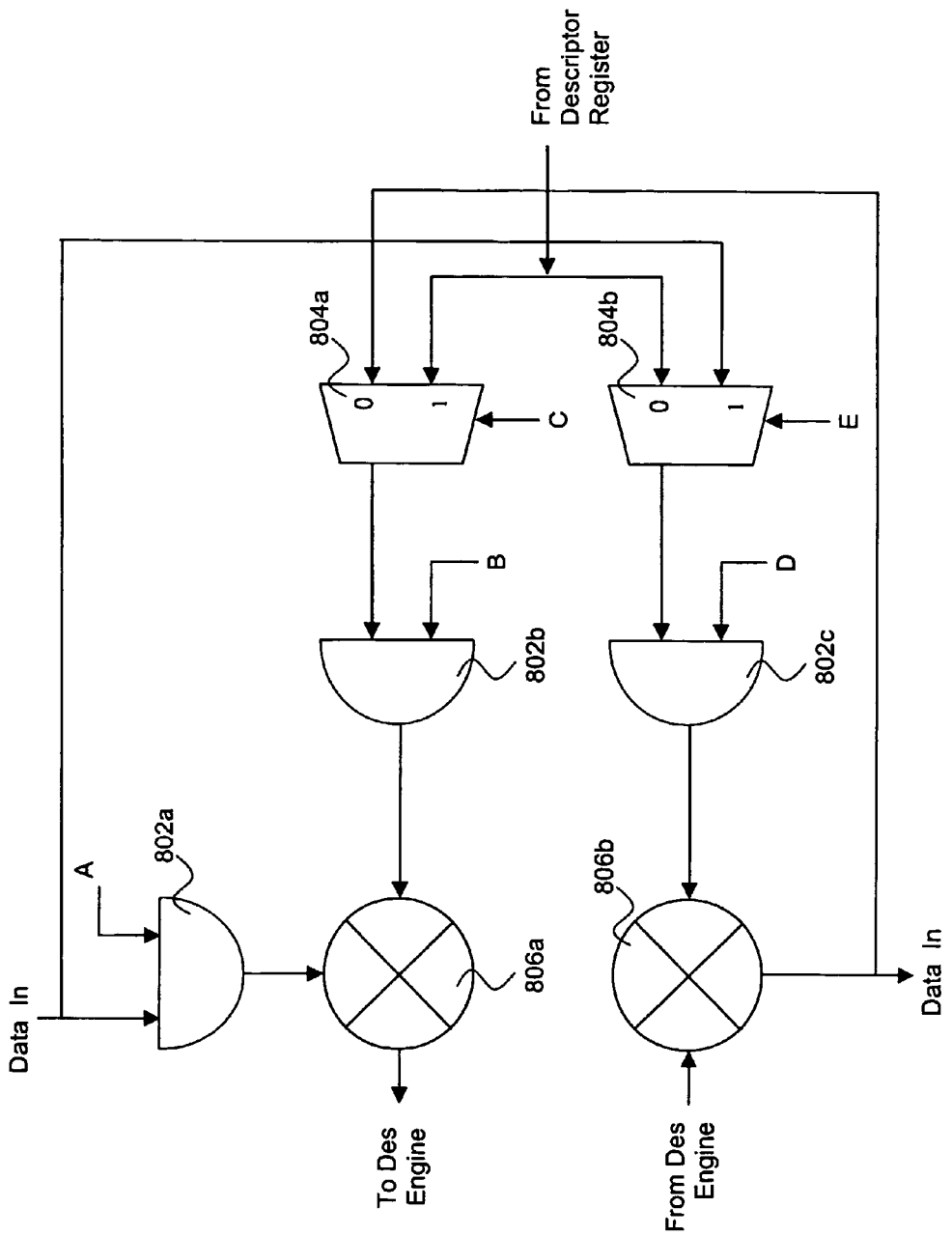
FIG. 8 illustrates the data traffic router of FIG. 7 in further details, in accordance with one embodiment.

FIG. 8 illustrates data traffic router 702 of FIG. 7 in further details, in accordance with one embodiment. As illustrated, data traffic router 702 includes a number of AND gates 802a-802c, a number of multiplexors 804a-804b, and a number of XOR gates 806a-806b, coupled to each other as shown. More specifically, AND gate 802a receives the data block (data_in) of the security operation and control variable A as inputs, and perform a logical AND operation on the inputs. The result of the logical AND operation is provided to XOR gate 806a, which also receives the output of AND gate 802b as its other input. XOR gate 806a performs the logical XOR operation on its inputs, and the output is provided as input to the DES security engine core.

The output of AND gate 802b is generated based on the output of multiplexor 804a and control variable B. The output of multiplexor 804 is either the initial vector outputted from the earlier described initial vector registers, or the result of the DES operation on a prior data block, depending on the control variable C.

In like manner, XOR gate 806b receives the output from the DES security engine core and the output of AND gate 802c as inputs, and performs a logical XOR operation on the inputs to produce the current result of the DES security operation (data_out).

The output of AND gate 802c is generated based on the output of multiplexor 804c and control variable D. The output of multiplexor 804 is either the initial vector outputted from the earlier described initial vector registers, or the current input data block of the DES operation, depending on the control variable E.

The setting of the control variables A through E, for the various modes of DES operations are given in the following table:

| Modes | A | B | C | D | E |
|---|---|---|---|---|---|
| ECB Encrypt/Decrypt | 1 | 0 | X | 0 | X |
| CBC Encrypt | 1 | 1 | 1/0 | 0 | X |
| CBC Decrypt | 1 | 0 | X | 1 | 1/0 |
| CFB Encrypt | 0 | 1 | 1/0 | 1 | 0 |
| CFB Decrypt | 0/1 | 1/0 | 1/X | 1 | 0 | where X stands for "don't care".

Controller

Figure 9:
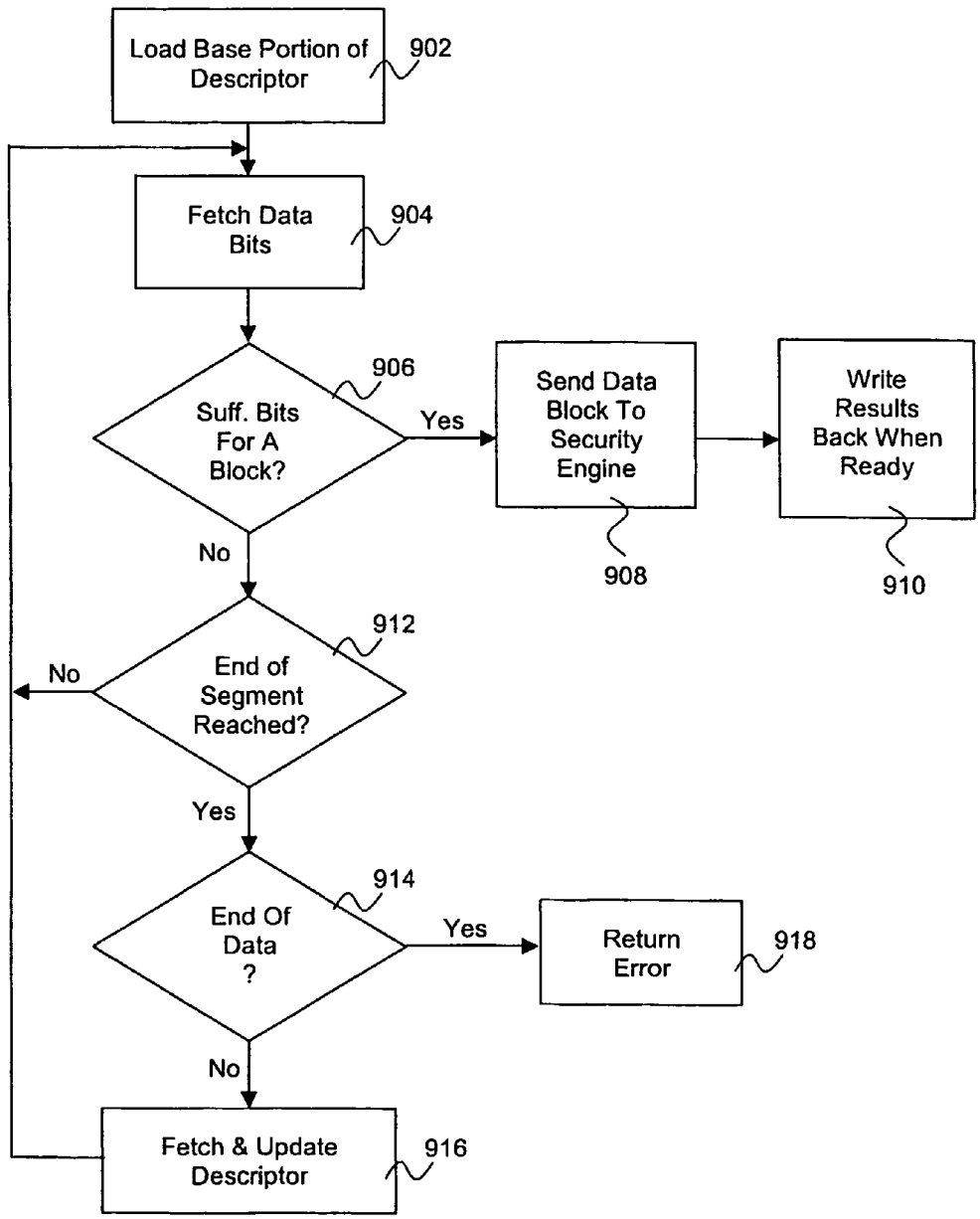
FIG. 9 illustrates the operational flow of the relevant aspects of the controller of the security subsystem of FIG. 5 in further details, in accordance with one embodiment.

FIG. 9 illustrates the relevant operational flow of controller 502 of FIG. 5 in further details, in accordance with one embodiment. As shown, upon instructed by control processor 102, controller 502 of security subsystem 106 causes the base portion 118a of the addressed descriptor 118 to be loaded in the appropriate descriptor registers 504 for the specified security operation, e.g. the descriptor registers 504 for a DES operation or the descriptor registers 504 for a hashing operation, block 902. Next in accordance with the starting address location of the base data segment (and its size), controller 502 causes the data bits of the base data segment to be fetched via one or more fetches (for the embodiment of FIG. 5, through data transfer unit 506, block 904. The number of fetches required depends on the size of the data bits of the data segment and the width of the data bus between memory 104 and security subsystem 106.

As the data bits successively arrive, controller 502 determines if sufficient amount of data bits to form an atomic block of data bits for the security operation has been accumulated, block 906. For as long as there are insufficient amount of data bits to form an atomic block of data bits for the security operation has been accumulated, and the end of the currently described data segment has not been reached, block 912, fetching, i.e. block 904, continues.

Once sufficient amount of data bits to form an atomic block of data bits for the security operation has been accumulated, controller 502 causes the data bits to be organized into a data block, and forwarded to the appropriate security engine, block 908. In due course (typically after a predetermined number of clock cycles), the result of the security operation on the provided data block becomes available. At such time, controller 502 causes the result to be written back to the storage locations of memory 104 as specified by the corresponding part of the descriptor 118, block 910.

Concurrently, once an atomic data block is provided to the security engine for operation, controller 502 also continues operation back at block 912 to determine if the end of the currently described data segment has been reached. As described earlier, if the end of the currently described data segment has not been reached, controller 502 continues operation at block 904. If the end of the currently described data segment has been reached, controller 502 further determines if all data segments of the data object has been processed or if all processed, whether security operation for a next data object is to be started, block 914. For the embodiment, controller 502 makes the determination based on the earlier described next descriptor/part address and its associated valid bit denoting whether the next descriptor/part address is valid. If not all data segments of the data object has been processed or processing for a new data object is to be started, controller 502 causes a continuation part of the current descriptor or the base part of the next descriptor to be loaded into descriptor registers 504, block 916. In the former case, the descriptor of the data object is updated with the data segment related information describing a new data segment. Upon updating or reloading descriptor registers 504, controller 502 continues operation at block 904.

Recall that the number of data bits of a data segment may be less than, equal to or greater than the size of the atomic block of the security operation, thus in the course of operation, at times, at block 912, after fetching all the data bits of a data segment in accordance to the starting address and the buffer size currently stored in descriptor registers 504, a quantity of data bits less than the size of the atomic data block of the security operation may remain. At such time, as described earlier, controller 502 determines if all data segments of the data object has been processed, block 914. If not, controller 504 causes a continuation part of the descriptor to loaded, updating the descriptor. For the embodiment, controller 504 also saves the address and size information of the previous part of the descriptor, e.g. in corresponding shadow registers (not shown). In one embodiment, controller 504 is equipped with 8 sets of shadow registers, enabling it to fetch as many as 8 data segments to form one atomic data block of the security operation. In other embodiments, more or less sets of shadow registers may be employed instead.

Back at block 914, if indeed all data segments of the data object has been processed, the residual data bits are indicative of the fact that the data object has a size that is not modulo the size of the atomic data block of the security operation (64 bits in the case of a DES operation, and 512 bits in the case of hashing operation). For the embodiment, an error is returned, block 918.

CONCLUSION AND EPILOGUE

Thus, it can be seen from the above descriptions, an improved method and apparatus for performing security services/operations for subsystems of a SOC has been described. The novel scheme advantageously offloads the control processor of the SOC and enables the SOC to operate more efficiently. While the present invention has been described in terms of the foregoing embodiments, those skilled in the art will recognize that the invention is not limited to these embodiments. The present invention may be practiced with modification and alteration within the spirit and scope of the appended claims. Thus, the description is to be regarded as illustrative instead of restrictive on the present invention.

What is claimed is:

1. A security subsystem comprising:
a first security engine to perform a first security operation on a block of data bits; a first plurality of registers to collectively store a first descriptor of a first data object having first one or more data segments, with each of said first one or more data segments having a plurality data bits; and a control portion coupled to said first registers and the first security engine to cause (a) said first descriptor of said first data object to be loaded into said first registers, first describing a first data segment of said first data object, and said first descriptor to be successively updated to correspondingly describe first additional data segments of said first data object, if any, one data segment at a time, and (b) data bits of each currently described one of said first data segments to be successively fetched, organized into blocks of data bits, and provided to said first security engine to have said first security operation to be successively performed on the provided blocks of data bits;
a second security engine to perform a second security operation on a block of data bits; a second plurality of registers to collectively store a second descriptor of a second data object having second one or more data segments, with each of said second one or more data segments having a plurality of data bits; and said control portion is further coupled to said second registers and the second security engine to cause (a) said second descriptor of said second data object to be loaded into said second registers, first describing a second data segment of said second data object, and said second descriptor to be successively updated to correspondingly describe second additional data segments of said second data object, if any, one data segment at a time, and (b) data bits of each currently described one of said second data segments to be successively fetched, organized into blocks of data bits, and provided to said second security engine to have said second security operation to be successively performed on the provided blocks of data bits.

2. The security subsystem of claim 1, where said first descriptor of said first data object includes, at a first instance in time, first storage location descriptions that describe first storage locations of data bits of a first of said first data segments of said first data object.

3. The security subsystem of claim 2, where said first storage location descriptions comprise a starting storage location address and a size of the data bits of said first data segments of said first data object.

4. The security subsystem of claim 2, where said first descriptor of said first data object includes, at a second instance in time, second storage location descriptions that describe second storage locations of data bits of a second of said first data segments of said first data object.

5. The security subsystem of claim 4, where said first storage locations and said second storage locations are contiguous storage locations.

6. The security subsystem of claim 4, where said first storage locations and said second storage locations are discontiguous storage locations.

7. The security subsystem of claim 1, where said control portion further causes the results of said first security operations performed for the provided blocks of data bits to be successively returned.

8. The security subsystem of claim 7, where said first descriptor of said first data object includes, at a first instance in time, first storage location descriptions that describe first storage locations for returning first results of said first security operations performed on the provided data bits of a first of said first data segments of said first data object.

9. The security subsystem of claim 8, where said first storage location descriptions comprise a starting storage location address.

10. The security subsystem of claim 8, where said first descriptor of said first data object includes, at a second instance in time, second storage location descriptions that describe second storage locations for returning second results of said second security operations performed on the provided data bits of a second of said first data segments of said first data object.

11. The security subsystem of claim 10, where said first storage locations and said second storage locations are contiguous storage locations.

12. The security subsystem of claim 10, where said first storage locations and said second storage locations are discontiguous storage locations.

13. The security subsystem of claim 1, where said first descriptor of said first data object also describes operating parameters to be employed to perform said first security operation on each of said provided blocks of data bits of said first data object, and said control portion further causes said described operating parameters to be provided to said first security engine.

14. The security subsystem of claim 1, wherein said first security operation is a DES operation.

15. The security subsystem of claim 14, wherein said DES operation is a selected one of a DES cipher operation and a DES decipher operation.

16. The security subsystem of claim 14, wherein said DES operation is a selected one of a DES ECB operation, a DES CBC operation and a DES CFB operation.

17. The security subsystem of claim 14, wherein said first descriptor of said first data object also describes operating parameters including a first and a second key of to be employed to perform said DES operation on each of said provided blocks of data bits of said first data object, and said first control portion further causes said described operating parameters including said first and second keys of said DES operation to be provided to said first security engine.

18. The security subsystem of claim 17, wherein said operating parameters further include a third key of said DES operation.

19. The security subsystem of claim 14, wherein said DES operation is a selected one of a DES CBC operation and a DES CFB operation; said security subsystem further comprises a data router coupled to said security engine to selectively route a current block of data bits of said first data object and a result of the selected DES security operation for a prior block of data bits to said security engine; and said control portion is further coupled to said data router to control its operation.

20. The security subsystem of claim 1, wherein one of the first and second security operations is a hashing operation.

21. The security subsystem of claim 20, wherein said hashing operation is a selected one of a MD5 operation and a SHA-1 operation.

22. The security subsystem of claim 20, wherein said first descriptor of said first data object also describes operating parameters including a plurality of chaining variables to be employed to perform said hashing operation on each of said blocks of data bits of said first data object, and said first control portion further causes said described operating parameters including said chaining variables to be provided to said first security engine.

23. The security subsystem of claim 1, wherein said security subsystem further comprises a control register to facilitate a subsystem external to said security subsystem in providing one more control instructions to said control portion of said security subsystem.

24. The security subsystem of claim 23, wherein at least one of said control instructions is a selected one of instructing said control portion to start said first security operation, to interrupt said external subsystem upon completing said first security operation for all blocks of data bits of said first data segments of said first data object, to interrupt said external subsystem upon completing said first security operation for all blocks of data bits of said first data object, and to stop said security subsystem upon completing said first security operation for all blocks of data bits of said first data segments of said first data object.

25. The security subsystem of claim 1, wherein said security subsystem further comprises a status register to facilitate said control portion of said security subsystem in providing one or more status to a subsystem external to said security subsystem.

26. The security subsystem of claim 25, wherein at least one of said status is a selected one of a pending interrupt issued on completion of said first security operation for all blocks of data bits of said first data segments of said first data object, a pending interrupt issued on completion of said first security operation for all blocks of data bits of said first data object, completion of said first security operation for all blocks of data bits of said first data segments of said first data object, completion of said first security operation for all blocks of data bits of said first data object and said security subsystem being in a busy state.

27. The security subsystem of claim 1, where said control portion further causes the results of said second security operations performed for the provided blocks of data bits to be successively returned.

28. The security subsystem of claim 1, where said second descriptor of said second data object also describes operating parameters to be employed to perform said second security operation for each of said blocks of data bits of said second data object, and said control portion further causes said described operating parameters to be provided to said second security engine.

29. The security subsystem of claim 1, wherein said first security operation is a DES operation and said second security operation is a hashing operation.

30. The security subsystem of claim 1, wherein said security subsystem further comprises a data transfer unit coupled to said first security engine and said control portion to retrieve and provide said data bits of said first data object for said first security engine, and return the results of said first security operations performed for said data bits of said first data object, under the control of said control portion.

31. An apparatus comprising: a memory to store data and descriptive information of said data; a processor coupled to said memory to set up in said memory a first descriptor having first one or more parts, describing a first data object having first one or more data segments, with each of said first one or more data segments having a plurality of data bits; and a security subsystem coupled to said memory and said processor to perform a first security operation on each of a plurality of blocks of data bits of said first one or more data segments of said first data object, responsive to a request of said processor, wherein the security subsystem is equipped to (a) first retrieve a first part of said first descriptor, and then successively updates said first descriptor with its additional parts, if applicable, (b) successively fetch the data bits of said first one or more data segments of said first data object in accordance with the successive current descriptions of the first descriptor, (c) successively organize the fetched data bits into blocks of data bits, (d) successively perform said first security operation on said organized data blocks, and (e) successively return the results of said successive first security operations wherein the security subsystem comprises a first security engine to perform said first security operation for a block of data bits; a first plurality of registers to collectively store the currently retrieved part of a data object descriptor; and a control portion coupled to said first registers and the first security engine to cause (a) said first part of said first descriptor of said first data object to be loaded into said first registers, and then successively undated to successively describe said first one or more data segments of said first data object, (b) data bits of each currently described one of said first data segments to be successively fetched, organized into blocks of data bits, and provided to said first security engine to have said first security operation to be successively performed on the provided data blocks, and (c) the results of said successively performed first security operations to be returned.

32. The apparatus of claim 31, wherein each of said first one or more parts of said first descriptor describes storage locations of data bits of a corresponding one of said first one or more data segments of said first data object.

33. The apparatus of claim 32, wherein said first one or more data segments of said first data object comprise two or more data segments, and the storage locations of the data blocks of at least one of the data segments are discontiguous from the storage location of the data blocks of the other data segments of said first data object.

34. The apparatus of claim 31, wherein each of said first one or more parts of said first descriptor describes storage locations for returning the results of said first security operations for the data bits of a corresponding one of said first one or more data segments of said first data object.

35. The apparatus of claim 34, wherein said first one or more data segments of said first data object comprise two or more data segments, and the storage locations for returning the results of said first security operations performed for the data bits of at least one of the data segments are discontiguous from the storage location for returning the results of said first security operations performed for the data bits of the other data segments of said first data object.

36. The apparatus of claim 31, wherein at least a first part of said first descriptor of said first data object also describes operating parameters to be employed to perform said first security operation for each of said blocks of data bits of said first data object.

37. The apparatus of claim 31, wherein said first security operation is a DES operation.

38. The apparatus of claim 37, wherein said DES operation is a selected one of a DES cipher operation and a DES decipher operation.

39. The apparatus of claim 37, wherein said DES operation is a selected one of a DES ECB operation, a DES CBC operation and a DES CFB operation.

40. The apparatus of claim 37, wherein at least a first part of said first descriptor of said first data object also describes operating parameters including a first and a second key of to be employed to perform said DES operation on each of said blocks of data bits of said first data object.

41. The apparatus of claim 40, wherein said operating parameters further include a third key of said DES operation.

42. The apparatus of claim 37, wherein said DES operation is a selected one of a DES CBC operation and a DES CFB operation; and said security subsystem is further equipped to selectively employ a current block of data bits of said first data object and a result of the selected DES security operation for a prior block of data bits to perform the selected DES operation.

43. The apparatus of claim 31, wherein said security operation is a hashing operation.

44. The apparatus of claim 43, wherein said hashing operation is a selected one of a MD5 operation and a SHA-1 operation.

45. The apparatus of claim 43, wherein at least a first part of said first descriptor of said first data object also describes operating parameters including a plurality of chaining variables to be employed to perform said hashing operation for each of said blocks of data bits of said first data object.

46. The apparatus of claim 31 wherein said security subsystem further comprises a control register to facilitate said processor in providing one more control instructions to said security subsystem.

47. The apparatus of claim 46, wherein at least one of said control instructions is a selected one of instructing said security subsystem to start said first security operation, to interrupt said processor upon completing said first security operation for all blocks of data bits of said first data segments of said first data object, to interrupt said processor upon completing said first security operation for all blocks of data bits of said first data object, and to stop said security subsystem upon completing said first security operation for all blocks of data bits of said first data segments of said first data object.

48. The apparatus of claim 31, wherein said security subsystem further comprises a status register to facilitate said security subsystem in providing one or more status to said processor.

49. The apparatus of claim 48, wherein at least one of said status is a selected one of a pending interrupt issued on completion of said first security operation for all blocks of data bits of said first data segments of said first data object, a pending interrupt issued on completion of said first security operation for all blocks of data bits of said first data object, completion of said first security operation for all blocks of data bits of said first data segments of said first data object, completion of said first security operation for all blocks of data bits of said first data object and said security subsystem being in a busy state.

50. An apparatus comprising: a memory to store data and descriptive information of said data; a processor coupled to said memory to set up in said memory a first descriptor having first one or more parts, describing a first data object having first one or more data segments, with each of said first one or more data segments having a plurality of data bits; and a security subsystem coupled to said memory and said processor to perform a first security operation on each of a plurality of blocks of data bits of said first one or more data segments of said first data object, responsive to a request of said processor, wherein the security subsystem is equipped to (a) first retrieve a first part of said first descriptor, and then successively updates said first descriptor with its additional parts, if applicable, (b) successively fetch the data bits of said first one or more data segments of said first data object in accordance with the successive current descriptions of the first descriptor, (c) successively organize the fetched data bits into blocks of data bits, (d) successively perform said first security operation on said organized data blocks, and (e) successively return the results of said successive first security operations wherein said processor is also to set up in said memory a second descriptor having second one or more parts, describing a second data object having second one or more data segments, with each of said second one or more data segments having a plurality of data bits; and said security subsystem is also to perform a second security operation for data bits of said second one or more data segments of said second data object, responsive to a request of said processor, wherein the security subsystem is also equipped to (a) first retrieve a first part of said second descriptor, and then successively updates said second descriptor with its additional parts, if applicable, (b) successively fetch the data bits of said second one or more data segments of said second data object in accordance with the successive current descriptions of the second descriptor, (c) successively organized the successively fetched data bits into blocks of data bits, (d) successively perform said second security operation on said successively organized blocks of data bits, and (d) successively return the results of said successive second security operations.

51. The apparatus of claim 50, wherein said first security operation is a DES operation and said second security operation is a hashing operation.

52. The apparatus of claim 31, wherein said apparatus is disposed on a single integrated circuit.

53. A method comprising: a processor setting up in a memory a first descriptor having first one or more parts, describing a first data object having first one or more data segments, with each of said first one or more data segments having a plurality of data bits; and a security subsystem performing a first security operation on the data bits of said first one or more data segments of said first data object, responsive to a request of said processor, by (a) first retrieving a first part of said first descriptor, and then successively updating said first descriptor with its additional parts, if applicable, (b) successively fetching the data bits of said first one or more data segments of said first data object in accordance with the successive current descriptions of the first descriptor, (c) successively organizing the fetched data bits into blocks of data bits, (d) successively performing said first security operation on said successively organized data blocks, and (d) successively returning the results of said successive first security operations, wherein the method further comprises said processor setting up in said memory a second descriptor having second one or more parts, describing a second data object having second one or more data segments, with each of said second one or more data segments having a plurality of data bits; and said security subsystem performing a second security operation on data bits of said second one or more data segments of said second data object, responsive to a request of said processor, by (a) first retrieving a first part of said second descriptor, and then successively updating said second descriptor with its additional parts, if applicable, (b) successively fetching the data blocks of said second one or more data segments of said second data object in accordance with the successive current descriptions of the second descriptor, (c) successively organizing the fetched data bits into blocks of data bits, (d) successively performing said second security operation for said successively organized blocks of data bits, and (e) successively returning the results of said successive second security operations.

54. The method of claim 53, wherein each of said first one or more parts of said first descriptor describes storage locations of data bits of a corresponding one of said first one or more data segments of said first data object.

55. The method of claim 54, wherein said first one or more data segments of said first data object comprise two or more data segments, and the storage locations of the data blocks of at least one of the data segments are discontiguous from the storage location of the data blocks of the other data segments of said first data object.

56. The method of claim 53, wherein each of said first one or more parts of said first descriptor describes storage locations for returning the results of said first security operations for data bits of a corresponding one of said first one or more data segments of said first data object.

57. The method of claim 56, wherein said first one or more data segments of said first data object comprise two or more data segments, and the storage locations for returning the results of said first security operations performed for the data bits of at least one of the data segments are discontiguous from the storage location for returning the results of said first security operations performed for the data bits of the other data segments of said first data object.

58. The method of claim 53, wherein at least a first part of said first descriptor of said first data object also describes operating parameters to be employed to perform said first security operation for data bits of said first data object.

59. The method of claim 53, wherein said first security operation is a DES operation.

60. The method of claim 59, wherein said DES operation is a selected one of a DES cipher operation and a DES decipher operation.

61. The method of claim 59, wherein said DES operation is a selected one of a DES ECB operation, a DES CBC operation and a DES CFB operation.

62. The method of claim 59, wherein at least a first part of said first descriptor of said first data object also describes operating parameters including a first and a second key of to be employed to perform said DES operation on each of said data blocks of said first data object.

63. The method of claim 62, wherein said operating parameters further include a third key of said DES operation.

64. The method of claim 59, wherein said DES operation is a selected one of a DES CBC operation and a DES CFB operation; and said method further comprises said security subsystem selectively employing a current block of data bits of said first data object and a result of the selected DES security operation for a prior block of data bits to perform the selected DES operation.

65. The method of claim 53, wherein said security operation is a hashing operation.

66. The method of claim 65, wherein said hashing operation is a selected one of a MD5 operation and a SHA-1 operation.

67. The method of claim 65, wherein at least a first part of said first descriptor of said first data object also describes operating parameters including a plurality of chaining variables to be employed to perform said hashing operation for each of said blocks of data bits of said first data object.

68. The method of claim 53 wherein said method further comprises said processor providing one more control instructions to said security subsystem.

69. The method of claim 68, wherein at least one of said control instructions is a selected one of instructing said security subsystem to start said first security operation, to interrupt said processor upon completing said first security operation for all data bits of one of said first data segments of said first data object, to interrupt said processor upon completing said first security operation for all data bits of said first data object, and to stop said security subsystem upon completing said first security operation for all data bits of one of said first data segments of said first data object.

70. The method of claim 53, wherein said method further comprises said security providing one or more status to said processor.

71. The method of claim 70, wherein at least one of said status is a selected one of a pending interrupt issued on completion of said first security operation for all data bits of one of said first data segments of said first data object, a pending interrupt issued on completion of said first security operation for all data bits of said first data object, completion of said first security operation for all data bits of one of said first data segments of said first data object, completion of said first security operation for all data bits of said first data object and said security subsystem being in a busy state.

72. The method of claim 53, wherein said first security operation is a DES operation and said second security operation is a hashing operation.

\* \* \* \* \*